Oct. 27, 1964  H. SIGG  3,154,181
SELF-ENGAGING SYNCHRONOUS GEAR COUPLING
Filed Nov. 30, 1961  9 Sheets-Sheet 1

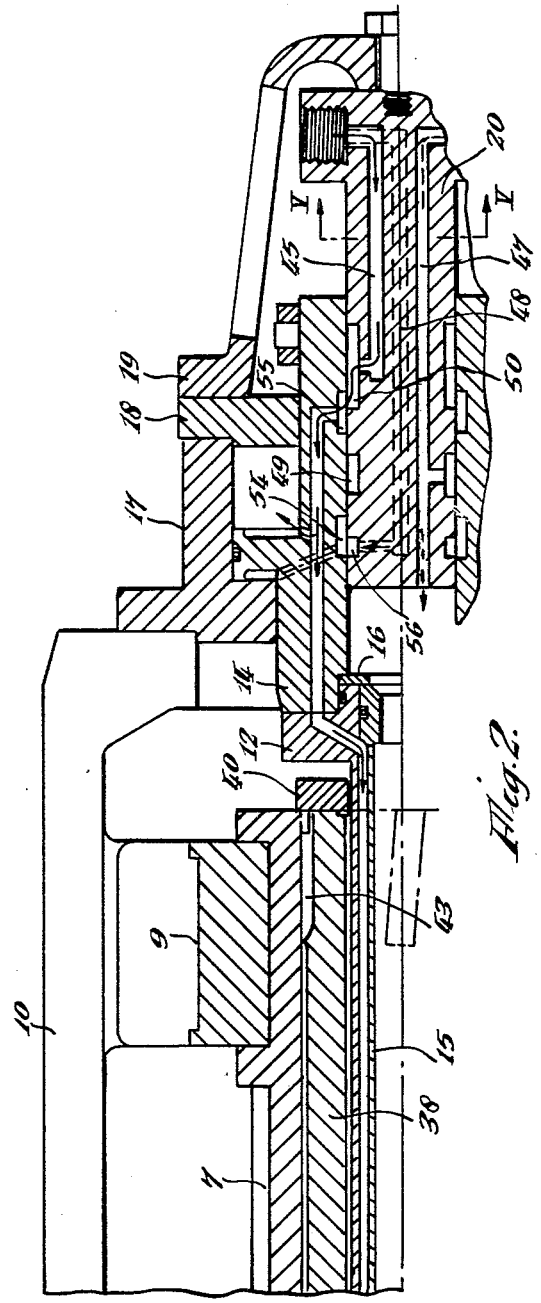

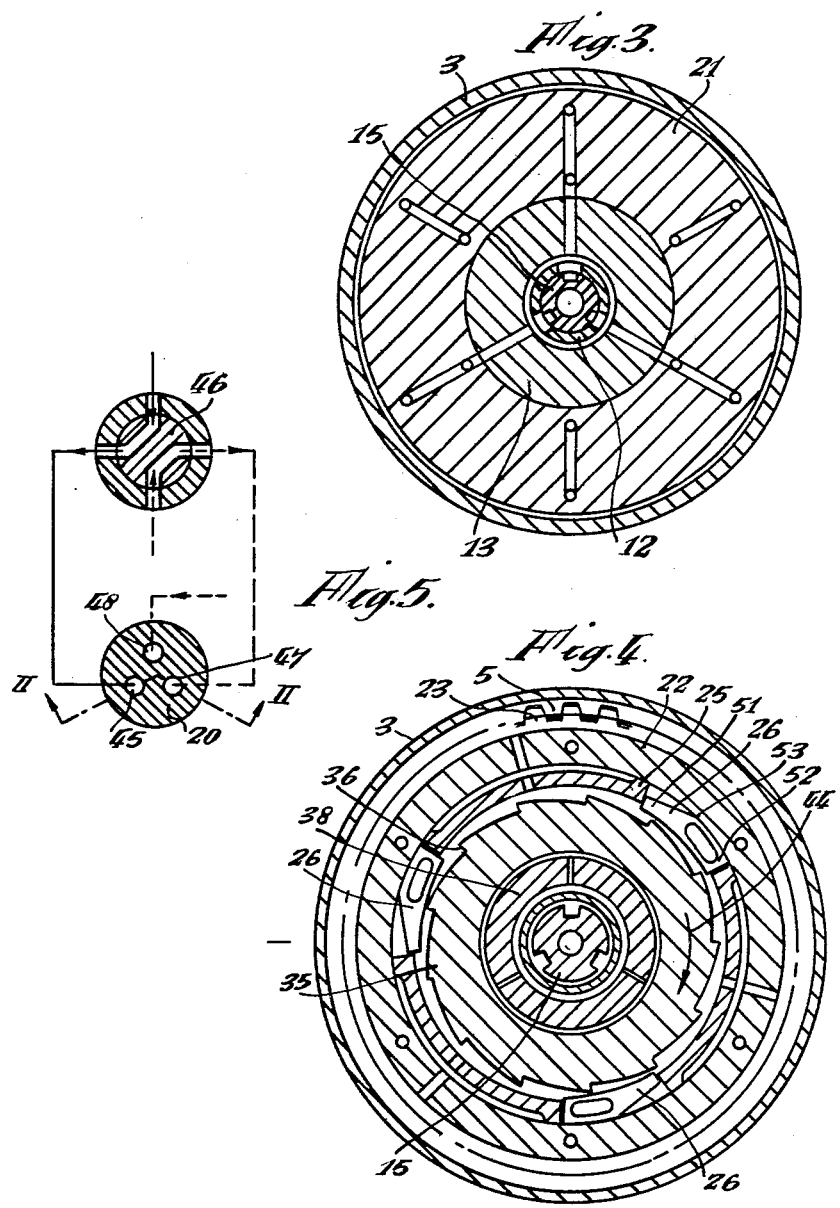

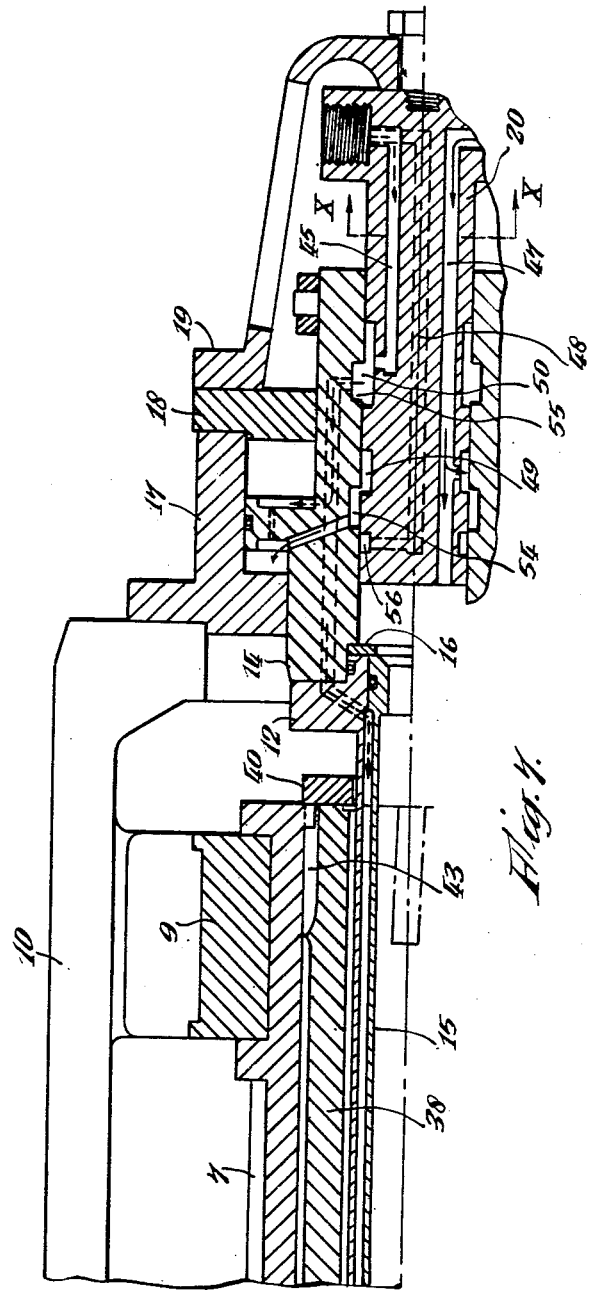

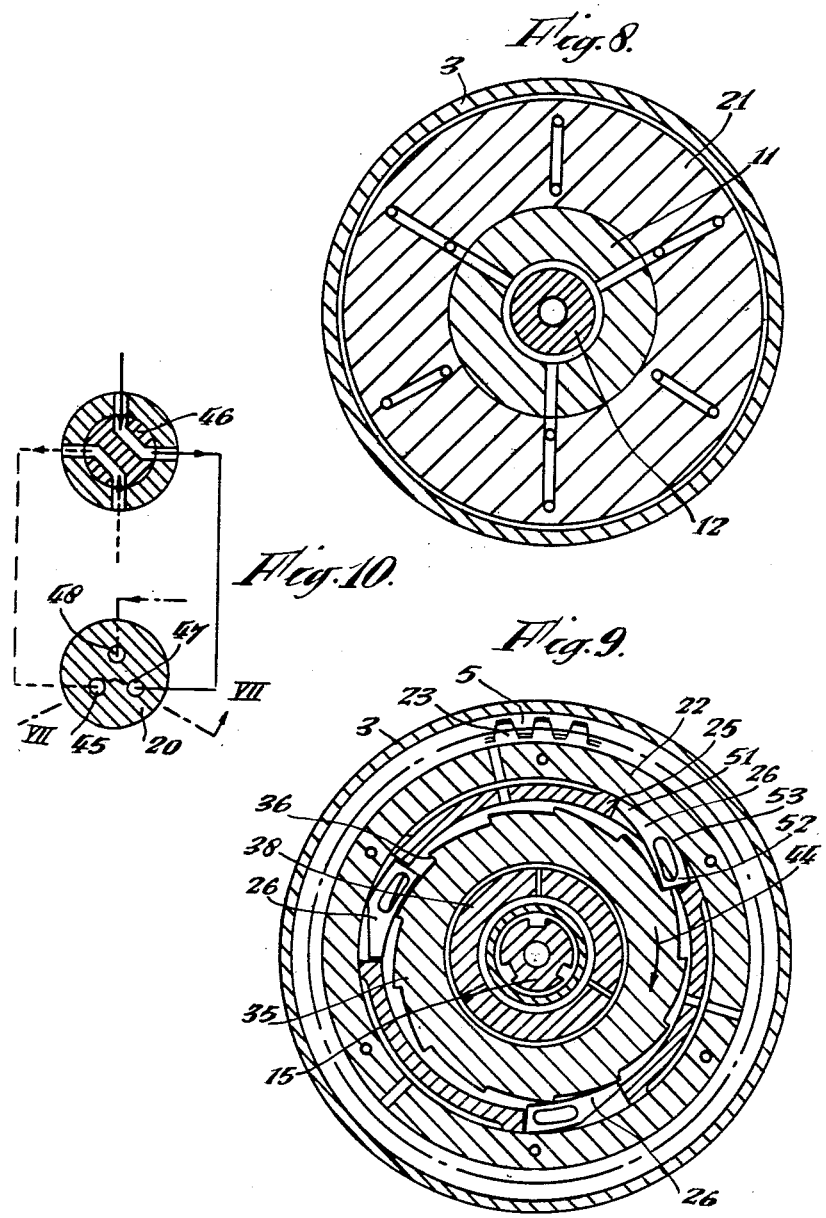

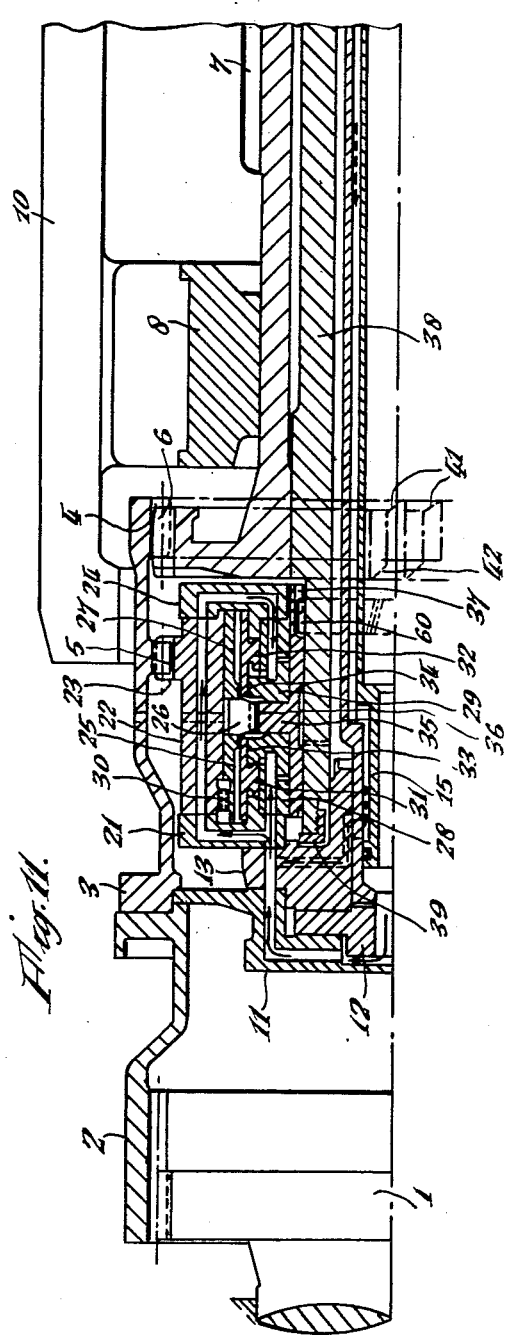

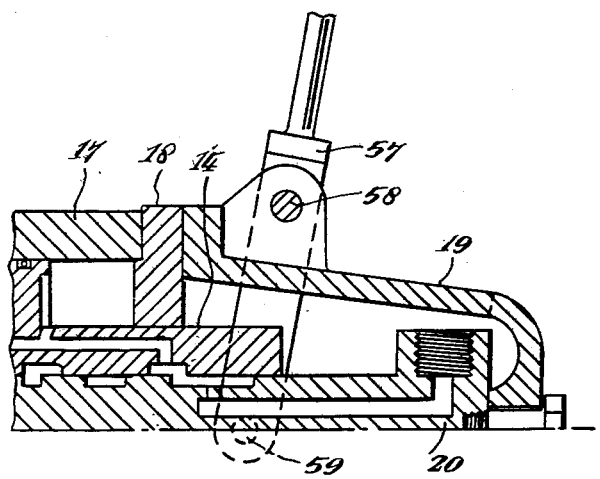
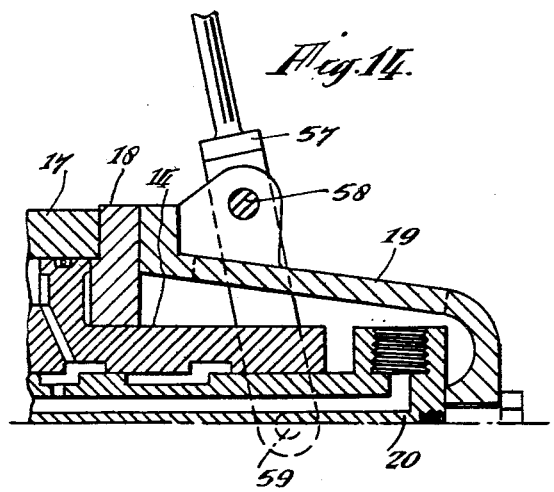

United States Patent Office 3,154,181
Patented Oct. 27, 1964

3,154,181
SELF-ENGAGING SYNCHRONOUS
GEAR COUPLING
Hans Sigg, Widen, Aargau, Switzerland, assignor to Maag
Gear Wheel & Machine Company Limited, Zurich,
Switzerland, a company of Switzerland
Filed Nov. 30, 1961, Ser. No. 156,067
Claims priority, application Germany, Dec. 5, 1960,
M 47,314
10 Claims. (Cl. 192—67)

The invention relates to a self-engaging synchronous gear coupling of the kind having a coupling sleeve adapted to perform a limited screwing movement relatively to a first coupling element, such sleeve having bevelled tooth ends, the coupling tooth system of such sleeve being moved axially of the second coupling element by means of pawls when the two coupling elements are moved relatively to one another in one direction by means of a coarse screwthread. For instance, in one such coupling the pawls are moved into and out of engagement by the kinetic energy of a flowing liquid.

Couplings of this kind are of use, for instance, in vehicle drives for connecting up a gas turbine to an already running apparatus driven by a steam turbine. A disadvantage of this coupling is that the screwable coupling sleeve and its screwthread are used to transmit force, and so these delicate components must be of correspondingly heavy design, so that there is an upper limit on speed and a limitation on torque.

This disadvantage is obviated by the synchronous gear coupling according to the present invention.

According to the present invention, a coupling of the kind referred to is characterised in that the screwing movement of the coupling sleeve leads to axial displacement of a control element and, at the end of this first component movement, the coupling sleeve engages in an initial position with the second coupling element, and, because of the axial movement of the control element, an external force operates in a second component movement to fully engage the gear coupling by a substantially axial movement.

Consequently, the coupling sleeve and pawls which perform the screwing movement can be relieved of transmitted torque in the fully engaged position. The result for these delicate components is that they can be of very light construction and can therefore be operated at much higher speeds, while the known robust gear coupling which transmits the torque in the engaged position can be of a size and design such that the greatest torques which are likely to occur can be transmitted satisfactorily.

Forming part of prior art in this connection is a gear coupling in which a sleeve-like intermediate member which has an inner coarse screwthread, an outer coupling tooth ring and possibly engaging means such as pawls or the like can be screwed along a corresponding outer coarse screwthread of one coupling element, so that the outer toothed ring is engaged with or disengaged from a corresponding inner tooth ring of the other coupling element, a shift sleeve being provided which can be shifted axially on one of the coupling elements and which has straight teeth and which, when the coupling tooth system is fully engaged, can be shifted selectively either into a position in which, because its straight teeth engage with matching straight teeth of the intermediate member on the one hand and of a coupling element on the other hand, a screwing of the intermediate member is prevented, or into a position in which at least one of the systems of straight teeth of the shift sleeve is disengaged from their mating teeth, so that the intermediate member can be screwed, while when the coupling teeth are disengaged the shift sleeve can be moved only into the last-mentioned position. A distinctive feature of this known coupling is that the straight tooth systems of the shift sleeve and the co-operating straight tooth system on at least one of the co-operating end faces are so inclined tangentially relatively to the vertical plane and to the coupling axis that, when the coupling tooth system is in the disengaged state, if the shift sleeve is moved axially to secure the intermediate member, because of the engagement between these end faces the shift sleeve is rotated relatively to one of the coupling elements, so that the intermediate member, because its straight tooth system is in engagement in one straight tooth system of the shift sleeve, is screwed towards the engaged position of the coupling. The disadvantages outlined in connection with the coupling first mentioned in the opening part hereof are fully and similarly operative for the last-described coupling.

One form of coupling according to the present invention is illustrated by way of example diagrammatically in the accompanying drawings, wherein:

FIGS. 1 and 2 together (FIG. 2 being a continuation of the right-hand end of FIG. 1) are substantially a half longitudinal section of the coupling in the disengaged position, the section being taken on the line II—II in FIG. 5;

FIGS. 3 and 4 are cross-sections taken on the lines III—III and IV—IV, respectively, in FIG. 1;

FIG. 5 is a cross-section taken on the line V—V in FIG. 2, and also including a cross-section of a control valve which is not shown elsewhere;

FIGS. 6 and 7 are similar views to FIGS. 1 and 2, but showing the coupling in a first phase of the engaged position, the section being taken on the line VII—VII in FIG. 10;

FIGS. 8 and 9 are cross-sections taken on the lines VIII—VIII and IX—IX, respectively, in FIG. 6;

FIG. 10 is a similar view to FIG. 5, taken on the line X—X in FIG. 7, and showing the control valve in another position;

FIGS. 11 and 12 are similar views to FIGS. 1 and 2, but showing the coupling in the final phase of engagement;

FIG. 13 is a fragment of FIG. 2 showing a modification;

FIG. 14 is a similar view to FIG. 13, put showing a position similar to the position shown in FIG. 12.

Figure 1:
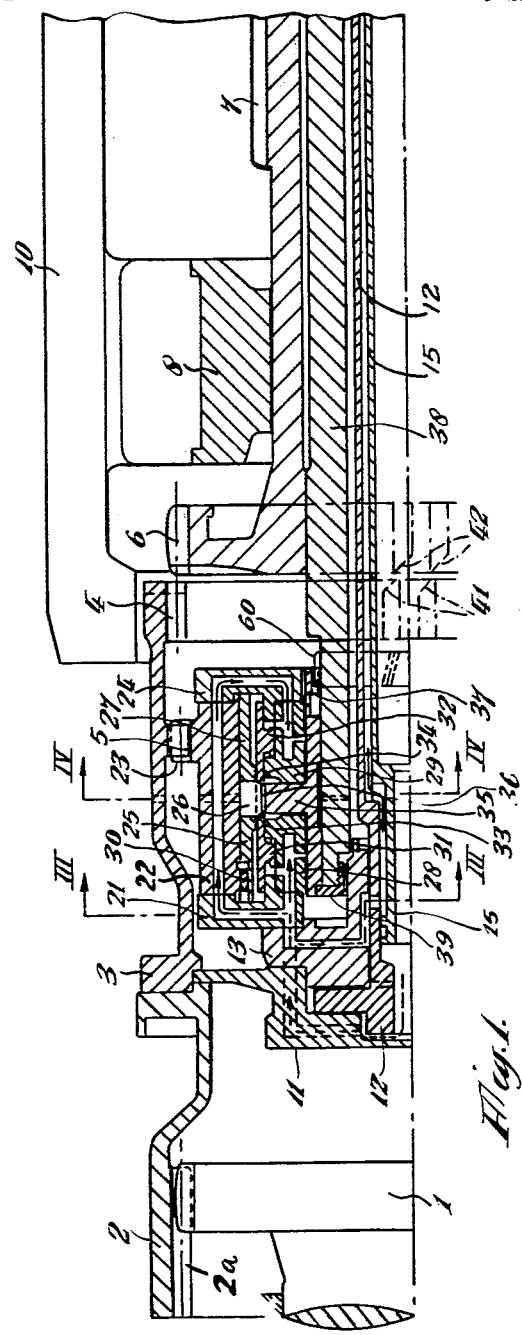
Figure 6:
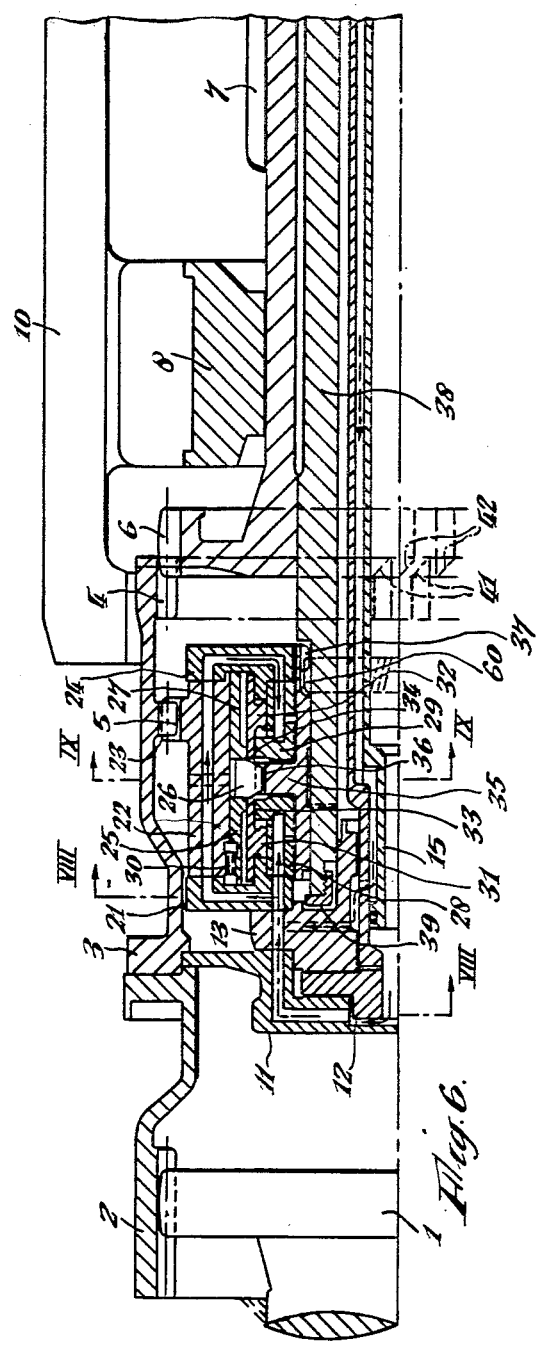

A first coupling or driving gear 1 is rigidly connected to a shaft of a gas turbine for additional propulsion of a ship. A coupling sleeve 2 having internal teeth 2a can move axially on the gear 1 and is rigidly connected to a second sleeve 3 having internal toothing 4 and 5. The two sleeves 2, 3 co-operate to form a coupling sleeve. A second coupling or driven gear 6 is rigidly connected to a gear 7 of a transmission associated with a steam turbine forming the main propulsion unit of a ship. The gear 7 is mounted in two plain bearings 8, 9 of a gearbox 10. A flanged plate 11 is secured between the two component sleeves 2 and 3 and serves to withstand axial forces of a sleeve 12. A flanged ring 13 is rigidly connected to the flanged plate 11, bears axial forces of the sleeve 12, and also serves for radial mounting of the sleeve 12. The sleeve 12 is rigidly connected to a piston 14 which is also a control element, another sleeve 15 following the movements of the piston 14 since the sleeve 15 is retained against radial and axial movement within and relatively to the sleeve 12. Axial retention of the sleeve 15 within the sleeve 12 is aided by a disc 16 clamped between the sleeve 12 and the piston 14. A piston cylinder 17 is secured to a gearbox 10, and a flanged ring 18 together with a flanged member 19 are screwed on to the cylinder 17. A control or distributing member 20 is secured by a screw to the flanged member 19 and extends into the piston 14.

Another flanged member 21, together with a sleeve 22 and a flanged member 24, are secured to the flanged ring 13 and constitute a first intermediate member. The sleeve 22 has external teeth 23 which engage with considerable flank clearance with the inner toothing 5 of the sleeve 3. Disposed in the sleeve 22 is a slotted sleeve 25 which has external splines 30 engaging with integral splines of the sleeve 22. Pawls 26 are freely movable in the slots of the sleeve 25. A spacer sleeve 27 secures the pawls 26 against lateral shifting. Intermediate rings 28, 29 are rigidly connected to the two flanged members 21, 24 and form plain bearings. All the components of the coupling bear through these plain bearings against a flanged ring 35 and a sleeve 38.

Two piston-like rings 31, 32 are axially movable and bounded laterally by the two flanged members 21, 24, engage in sealing-tight fashion around their inner peripheries with the intermediate rings 28 and 29, and lock the pawls 26, that is, control their position by means of corresponding conical surfaces 33, 34. The flanged ring 35 is rotatably mounted between and in the two intermediate rings 28 and 29, has ratchet toothing 36 on its flange part, and internal helical toothing 37 on its annular part. Matching external helical toothing 60 is provided on the sleeve 38 which is formed as a second intermediate member and which is retained laterally by rings 39, 40 rigidly connected to it. The helical tooth system 37, 60 can be compared with a coarse screwthread. The sleeve 35 is so mounted on the sleeve 38 as to be rotatable and displaceable therealong. The sleeve 38 is so mounted in the pinion 7 as to be movable therealong by a screwing motion produced by means of a groove and peg.

The helical toothing 37 on the ring 35 and bevelled parts 41, 42 on the internal tooth system 4 and coupling gear 6 have the same pitch. The pitch of a groove 43 in the sleeve 38 depends upon the various radial clearances in the ratchet mechanism and in the engagements of the gear coupling.

A description of the operation of the synchronous gear coupling will be based on the hypothesis that the gas turbine is stationary and the gear coupling—that is, the inner tooth system 4 of the sleeve 3—is not in engagement with the coupling gear 6 (FIGS. 1–5). The steam turbine is rotating; consequently, the driven coupling gear 6, the gear 7, the sleeve 38 and the ring 35 are all rotating in the direction indicated by an arrow 44 (FIG. 4). The pawls 26 cannot engage in the ratchet teeth 36 since they are thrust out of engagement therewith. Also, the pawls 26 are kept in the disengaged state by the conical surfaces 33, 34 of the two pistons 31, 32 operated by medium-pressure oil which enters through a duct 45 and which also maintains the piston 14 in the left-hand position (FIG. 2). Pressure oil is supplied to the duct 45 from a control valve 46 in the direction indicated by solid-line arrows (FIGS. 2 and 5); oil at a lower pressure (low-pressure oil) fills a duct 47, through the valve 46, as indicated by dotted-line arrows (FIGS. 2 and 5), and low-pressure oil also fills a duct 48 as indicated by chain-line arrows. Some of the oil is used for lubrication. The left-hand piston chamber is also kept full of oil.

To bring the coupling into the stand-by position for automatic synchronisation and engagement, all that is required is to change over the control valve 46 from the position shown in FIG. 5 to the position shown in FIG. 10. Pressure oil is then supplied to the duct 47, with the result that the two pistons 31, 32 having the conical surfaces 33, 34 are disengaged from the pawls 26 and the latter are released. Both sides of the piston 14 are now filled with low-pressure oil. Since the right-hand piston face is larger than the left-hand piston face, a leftward force is operative upon the piston and is large enough to secure the coupling in the disengaged position. An annular groove 49 is filled with medium-pressure oil. An annular groove 56 is always supplied with low-pressure oil, whatever the position of the valve 46.

The gas turbine starts to come into operation during or after the changeover of the control valve 46 to the position shown in FIG. 10. Consequently, the coupling gear 1, the two coupling sleeves 2, 3, the internal toothings 4 and 5, the flanged members 11, 13, 21, the sleeve 22 with its external toothing 23, the flanged member 24, the slotted sleeve 25 with the pawls 26 and spacer sleeve 27, the intermediate rings 28, 29, and the pistons 31, 32 all start to rotate in the direction indicated by the arrow 44 (FIG. 4). The piston 14 and the sleeves 12 and 15 never rotate, either in the engaged or in the disengaged position. Once the speed of the gas turbine—that is, of the pawls 26 and the sleeve 22—has reached a desired level, parts 51 of the pawls are thrust outwards by centrifugal force and parts 52 of the pawls are engaged with the ratchet teeth 36 of the ring 35, since the pawl part 51 produces a greater moment relatively to a fulcrum 53 of the pawl than does the pawl part 52; the pawl pivots around the pivot or fulcrum 53. Immediately the speed of the sleeve 22 exceeds the speed of the gear 7, or of the coupling gear 6 and therefore of the sleeve 38 and of the ring 35 having the ratchet teeth 36, the edge of the pawl part 52 of one of the pawls 26 abuts the ratchet tooth system and entrains the same. The ring 35 therefore rotates in the direction indicated by the arrow 44 relatively to the sleeve 38 and, through the agency of the helical tooth system 37, 60, screws itself along the sleeve 38 into a position as shown in FIGS. 6–9. Because of this limited screwing movement of the ring 35, the sleeve 22 and therefore the coupling sleeve formed by the component sleeves 2 and 3 following such movement, the teeth of the gear couplings 4 and 6 move into an initial position which is shown in chain-lines in FIG. 6.

This movement, which is produced by one of the engaging pawls 26, leads to rotation of the two coupling halves comprising the coupling gears 1 and 6 relatively to one another in a particular direction. The axial component of the coarse screwthreads—that is, of the screwing movement of the coupling sleeve—leads to an axial movement being transmitted through the flanged member 11 to the sleeve 12 which transmits the movement to the piston 14. The difference pressure at the piston 14 must be overcome. Because of its annular grooves 54, 55 which are disposed in dependence upon the annular grooves 49, 50, 56 in the distributing element 20, the piston 14 is formed as a control element. In the intermediate position shown in FIGS. 6–9, the annular groove 49 which is supplied with pressure oil from the duct 47 engages with the annular groove 54 and provides a communication to the left-hand piston chamber of the piston 14. The piston 14 is therefore moved completely to the right by the pressure oil—that is, by the external force which is initiated. The ducts 45 and 48 are supplied with low-pressure oil.

Figure 12:
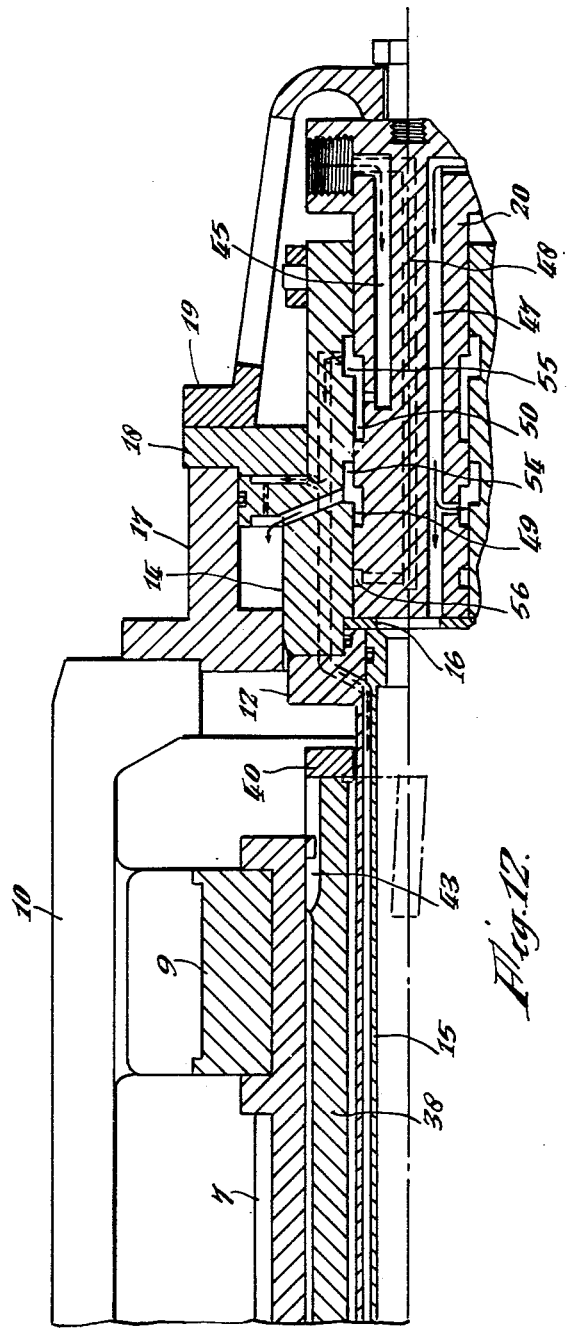

Because of this axial movement of the piston 14, all the available force is operative by way of the sleeve 12, flanged member 11 and coupling sleeve 3 with the internal tooth system 4 to thrust the coupling gear 6, so that the gear coupling is fully engaged as shown in FIGS. 11 and 12. A connection is therefore provided between the driving coupling gear 1 and the additionally driven gear 7 without the torque having to be transmitted through the delicate parts represented by the pawls 26 and coarse screwthread—that is, the helical tooth system 37, 60. Because of the helical groove 43, the sleeve 38, and therefore the flanged ring 35 bearing the ratchet teeth 36, are twisted slightly in the direction indicated by the arrow 44 relatively to the pinion 7 and therefore to the coupling gear 6. Consequently, a definite clearance is left between the pawls 26 and the ratchet teeth 36 so that neither the pawls nor the coarse screwthread can transmit a torque. Consequently, there is definitely no loading of delicate parts.

For disengagement, after the drive has been removed from the coupling gear 1, the control valve 46 is set to disengage as shown in FIG. 5, so that pressure oil flows through the duct 45 into the right-hand chamber of the piston 14 and thrusts the same to the left. All the components therefore return to the position shown in FIGS. 1–4, the pawls 26 being disengaged by the conical surfaces 33, 34 of the pistons 31, 32.

It may be convenient if the movements and positions of the piston 14, and therefore of the central sleeve 12, can be performed and achieved not just hydraulically but also mechanically, as is shown in FIGS 13 and 14. FIG. 13 shows the synchronous gear coupling in the disengaged position and secured by a lever 57 which is rotatably mounted on a pin 58 in the flanged member 19. A pin 59 engages in the right-hand end of the piston 14. FIG. 14 shows the engaged position of the coupling under similar assumptions. The advantage of the arrangement shown in FIGS. 13 and 14 is that, if the pressure oil fails, the coupling can be mechanically engaged when stationary and can serve as an ordinary manually operated gear coupling.

What I claim and desire to secure by Letters Patent is:

1. Self engaging synchronous gear coupling comprising a driving coupling unit (1–5) and a driven coupling unit (6, 7) mounted co-axially with the driving coupling unit and means providing an external force for fully engaging the two coupling units; the driven coupling unit consisting of a driven member (7) with coupling teeth (6) therearound, a central sleeve (38) operatively connected to said driven member (7), a first intermediate member (35) with jaw clutch teeth (36) therearound, means (37, 60) constraining said first intermediate member (35) for helical movement on, and relative axial movement to, said central sleeve (38) and driven member (7); the driving coupling unit consisting of a driving member (1) with coupling teeth therearound, a coupling sleeve (2, 3) with coupling teeth (2a, 4) therearound at both ends, with the teeth (2a) at one end of said sleeve always in engagement with said driving member (1) and the teeth (4) at the other end of the sleeve (2, 3) being normally out of engagement but adapted for engagement with said teeth (6) of said driven member (7), a second intermediate member (11, 13, 21, 22, 23, 24, 25, 27, 28, 29) connected to the said coupling sleeve (2, 3) and rotatably arranged on said driven coupling parts (6, 7, 38) and axially held in position relative to said first intermediate member (35), at least one pawl (26) mounted within a recess in said second intermeidate member and rotatable therewith and for engagement with the teeth (36) on the first intermediate member when the speed of rotation of the driving member and second intermediate member overtakes the speed of rotation of the first intermediate member, to initiate said constrained helical movement of said first intermediate member (35) for constraining said second intermediate member (11, 13, etc.) and said coupling sleeve (2, 3) for the same helical movement; a control means (12, 14, 15) connected to said driving coupling unit and movable axially relatively to said central sleeve (38) and responsive to the means providing the external force to cause full engagement of said coupling sleeve (2, 3) with the driven member (7) by moving the teeth (4) on the other end of the coupling sleeve (2, 3) substantially axially relative to said driving member (1) and driven member (7), respectively.

2. Self engaging synchronous gear coupling comprising a driving coupling unit and a driven coupling unit mounted co-axially with the driving coupling unit and means providing an external force for fully engaging the two coupling units; the driven coupling unit consisting of a driven member with coupling teeth therearound, a central sleeve operatively connected to said driven member, a first intermediate member with jaw clutch teeth therearound, means constraining said first intermediate member for helical movement on, and relative axial movement to, said central sleeve and driven member; the driving coupling unit consisting of a driving member with coupling teeth therearound, a coupling sleeve with coupling teeth therearound at both ends, with the teeth at one end of said sleeve always in engagement with said driving member and the teeth at the other end of the sleeve being normally out of engagement but adapted for engagement with said teeth of said driven member, a second intermediate member connected to the said coupling sleeve and rotatably arranged on said driven coupling parts and axially held in position relative to said first intermediate member, at least one pawl mounted within a recess in said second intermediate member and rotatable therewith and for engagement with the teeth on the first intermediate member when the speed of rotation of the driving member and second intermediate member overtakes the speed of rotation of the first intermediate member, to initiate said constrained helical movement of said first intermediate member for constraining said second intermediate member and said coupling sleeve for the same helical movement; a control means connected to said driving coupling unit and movable axially relatively to said central sleeve and responsive to the means providing the external force to cause full engagement of said coupling sleeve with the driven member by moving the teeth on the other end of the coupling sleeve substantially axially relative to the said driving member and driven member, respectively.

3. Synchronous gear coupling according to claim 2 characterized in that the coupling teeth at the end of the coupling sleeve which are adapted for engagement with the teeth on the driven member have cooperating bevelled tooth ends.

4. Synchronous gear coupling according to claim 2, characterized in that the said control means is part of a hydraulic control system and the external force is produced by pressure oil acting on a piston forming part of the control means.

5. Synchronous gear coupling according to claim 2 characterized in that the said central sleeve is operatively connected to said driven member in a manner such that the sleeve is free to move axially relative to said driven member.

6. Synchronous gear coupling according to claim 2, characterized in that the second intermediate member is flexibly connected to the coupling sleeve by means of a toothed coupling.

7. Synchronous gear coupling according to claim 2, characterized in that the said pawl is not rotatably fixed to any coupling parts but is loose and held in place for rocking movement within a chamber.

8. Synchronous gear coupling according to claim 7, characterized in that the pawl is disengaged from the ratchet teeth when the said coupling sleeve is disengaged from the driven coupling unit.

9. Synchronous gear coupling according to claim 7, chartcerized in that the said pawl has cone-shaped faces on both sides and that a disengaging ring is arranged on either side of the pawl to disengage the pawl from the said ratchet teeth by moving said rings axially towards the pawl.

10. Synchronous gear coupling according to claim 9, characterized in that the said disengaging rings are operated hydraulically and controlled by the control means.

References Cited in the file of this patent

UNITED STATES PATENTS

| 1,862,188 | Legge | June 7, 1932 |
| --- | --- | --- |
| 2,008,967 | Rossmann | July 23, 1935 |
| 2,784,822 | Heiser | Mar. 12, 1957 |
| 2,822,072 | Goss | Feb. 4, 1958 |
| 2,972,397 | Sinclair | Feb. 21, 1961 |